Oct. 6, 1964 G. L. CLAPPER 3,152,267

PROPORTIONAL PULSE EXPANDER

Filed Nov. 13, 1961

INVENTOR
GENUNG L. CLAPPER

BY

AGENT

United States Patent Office 3,152,267

Patented Oct. 6, 1964

3,152,267

PROPORTIONAL PULSE EXPANDER

Genung L. Clapper, Vestal, N.Y., assignor to International Business Machines Corporation, New York, N.Y., a corporation of New York Filed Nov. 13, 1961, Ser. No. 151,756

3 Claims. (Cl. 307—88.5)

This invention relates to a circuit for expanding an input pulse and more particularly to a circuit for producing an output pulse having an expanded width which is proportional to the width of the input pulse.

Known pulse expanders or pulse stretchers generally put out a pulse period which has no definite relationship to the width of the input pulse other than the fact that it is longer. If the input is 1 microsecond or 10 microseconds, the pulse put out will be of the same length and, of course, there are applications where this is desirable. However, there are applications where it has become desirable to produce an expanded pulse whose width is proportional to the width of the input pulse by some proportionality factor K. For example, in control systems it is desirable to produce an error signal which is a function of the width of the signal being monitored. Also, proportional pulse expansion would be useful in integration techniques where the width of the pulse is important. For instance, in changing from one system to another there may be a high speed source in one part of the system which is putting out rather narrow pulses and certain pulses from this source may have to be integrated to form a control pulse of some kind in a slower speed part of the system. This is quite often done in a feedback type manner where integration is done over a period of time and it is simpler and, in fact, more reliable if the pulses to be integrated are of substantial width in the case, for instance, where the period is something like 100 microseconds. A 1 microsecond pulse is a very small part of this period and it is difficult to make an integrator perform, whereas if the pulse can be expanded to 10 microseconds, integration may be more easily accomplished.

With the above in mind, the present novel circuit was devised for the purpose of taking an input pulse of a certain width and essentially adding width to it to the point where the output pulse becomes some factor greater, say times 10. This is done by the use of energy storage. The input pulse has a certain energy to the function of its width and this energy is transferred to an inductor. The time constant in the characteristics of the circuit are such that for the short input pulse all of the available energy is not stored and essentially the storage of energy is started and then cut off. The amount of energy that is stored will be a function of the input width and this is applied to a transistor with the time constant so arranged that this energy will be used at a certain rate which, for example, could be 8, 10, 12 or anything within reason. For purposes of illustration, the present circuit is set up for times 10 so that a 1 microsecond input pulse would produce enough energy in the inductor so that the transistor will be turned on for 10 microseconds to produce the longer 10 microsecond pulse.

Accordingly, the principal object of the present invention is to provide a proportional pulse expander circuit wherein an input pulse of width W produces an output pulse of width KW, where K is the proportionality factor.

A further object of the present invention is to provide a pulse expander circuit wherein a portion of the energy of the input pulse is stored in an inductor and used to control the conduction of a transistor to produce a proportional and expanded output pulse.

A still further object of the present invention is to provide a pulse expander circuit as in the preceding object and including means for compensating for any wasted current in the circuit.

The foregoing and other objects, features and advantages of the invention will be apparent from the following more particular description of a preferred embodiment of the invention, as illustrated in the accompanying drawings.

Figure 1:
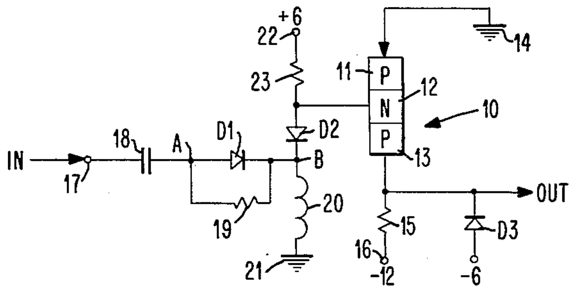
FIG. 1 is a schematic circuit diagram of the present invention.
Figure 2:
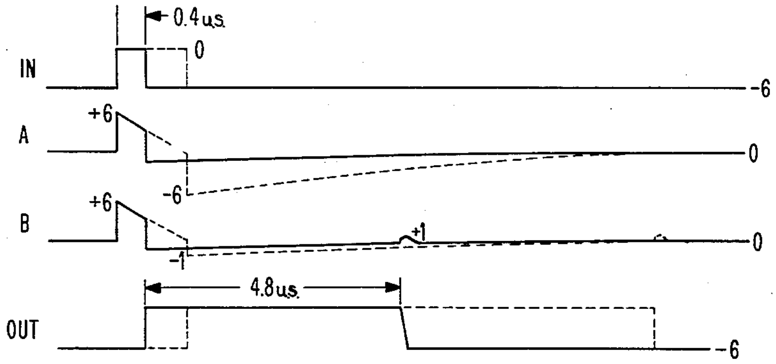
FIG. 2 shows a plurality of sample waveforms which may be produced at different points in the diagram shown in FIG. 1.

Referring to FIG. 1, the circuit comprises a grounded emitter normally non-conducting PNP type transistor 10 having an emitter electrode 11, a base electrode 12 and a collector electrode 13. The emitter is connected to a source of ground potential 14 and the collector is connected by way of a resistor 15 to a negative 12 volt terminal 16. The base of the transistor is connected to an input circuit which comprises an input terminal 17 connected to an input capacitor 18. The other side of capacitor 18 is connected at point A to a parallel combination of a diode D1 and resistor 19. The parallel combination in turn is connected to a point B between an inductor 20 and a diode D2 which form part of an energy-storage circuit for controlling the transistor 10. The inductor is connected to a source of ground potential 21 while diode D2 is connected directly to the base of the transistor and also to a positive 6 volt terminal 22 by way of a biasing resistor 23. The collector output of the transistor is shown connected to a negative 6 volt terminal 24 by way of a clamping diode D3.

Prior to the receipt of an input pulse at terminal 17, the input capacitor 18 is charged to a potential of 6 volts. The input line is at negative 6 volts, point A is at 0 volt, point B is at 0 volt, the base of the PNP transistor is at about +0.3 volt and the transistor output is at negative 6 volts. As the input rises to 0 volt at the start of the input pulse, point A rises from 0 volt to positive 6 volts and diode D1 conducts to drive point B to positive 6 volts. Energy in the capacitor 18 is now gradually transferred to the magnetic field of the coil 20 and the voltage at points A and B drops quite linearly toward 0 volt.

At the end of 0.4 microseconds, the input pulse terminates the discharge of the capacitor. As the input drops from 0 volt to negative 6 volts, point A drops from about positive 4 volts to negative 2 volts. As the magnetic field about the inductor collapses, point B is driven to about negative 1 volt and current flows through the emitter-base diode of the transistor and diode D2 to point B. The transistor is driven to saturation and the output rises sharply from negative 6 volts to 0 volt. By placing the capacitor charging resistor 19 in parallel with the diode D1, the charging current contributes to the base current of the transistor which compensates for the loss occasioned by the current flowing in the bias resistor 23 to positive 6 volts. This compensation is greatest for long pulses and tends to overcome the tendency for the pulse width amplification to drop off with the longer pulses.

As long as the current in diode D2 exceeds the current in the biasing resistor 23, a net base current flows and the PNP transistor is in conduction. As the energy in the inductor magnetic field is depleted and the capacitor charging current reduces, a point is reached where the net base current is 0 and the transistor cuts off. The output drops to negative 6 volts where it is clamped by the diode D3. A damped ringing action at point B serves to drive the base of the transistor to full cutoff and aids in the restoration of point A to 0 volt. The unit is now ready to receive another input pulse.

Figure 3:
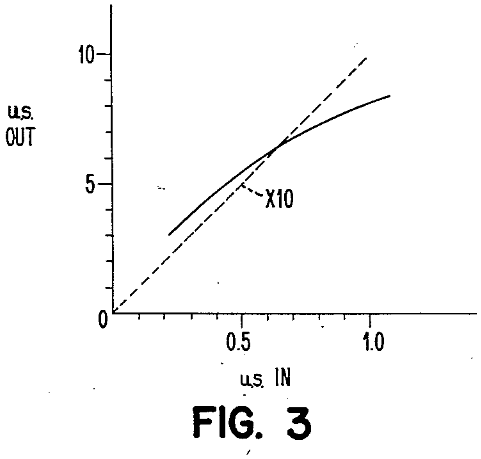
FIG. 3 is a plot showing the output pulse width versus the input pulse width.

The graph in FIG. 3 shows a plot of output pulse width as a function of input pulse width. The ideal ×10 is shown for comparison.

Figure 4:
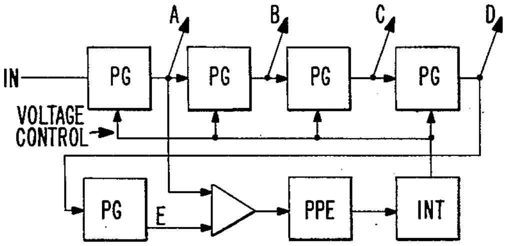
FIG. 4 is a block diagram of a self-adjusting sync generator system using the proportional pulse expander circuit of FIG. 1.

Referring to FIG. 4, an example is given to show a proposed use for the present proportional pulse expander. FIG. 4 shows schematically a system for generating timing pulses such as is fully disclosed in U.S. Patent 2,819,413, which issued on January 7, 1958. The addition of the proportional pulse expander to such a system would allow the circuitry to be used in an application where the input pulse repetition rate was lower by a factor of ten, with no other modification in circuitry. The circuit in the above referred to patent was designed to put out four one-microsecond pulses (A, B, C, D) in the four microsecond interval of a 250 kc. input pulse. Variations in the input frequency are compensated by integrating a short 0.4 microsecond pulse which was generated by comparing the A and E pulses. Now consider a case where it is desired to use a frequency of 25 kc. and generate four 10 microsecond (A, B, C, D) pulses. The generators themselves are easily adapted to this new requirement by a simple change in a capacitor. However, it is better to maintain the width of the E pulses, in order to maintain close control on the relation between the A and E pulses. Without the pulse expander, it would then be necessary to integrate 0.4 microsecond pulses at 40 microsecond intervals. A partial solution would be had by arbitrarily stretching the small pulses to a nominal width for easier integration, but this would not give the good control characteristics of a proportional expansion.

While the invention has been particularly shown and described with reference to a preferred embodiment thereof, it will be understood by those skilled in the art that various changes in form and details may be made therein without departing from the spirit and scope of the invention.

What is claimed is:

1. A pulse expander comprising a serially connected capacitor-inductance charging circuit across which an input pulse is applied for generating a current through said inductance which increases substantially linearly as the input pulse increases in length, a pulse generator, means for biasing said pulse generator to a nonconducting condition, wherein said means for biasing and said pulse generator include a predetermined resistance, means connected to the junction of said capacitor and said inductance for connecting said charging circuit to said pulse generator and said biasing means, means responsive to the termination of an input pulse for substantially disconnecting said capacitor from said inductance, wherein the current through said inductance in circuit with said pulse generator biases the same to conduction to provide an output pulse as a function of the input pulse width and the inductance-resistance time constant of the pulse generator circuit.

2. A pulse expander comprising a serially connected capacitor-inductance charging circuit across which an input pulse is applied for generating a current through said inductance which increases substantially linearly as the input pulse increases in length, a transistor, means for biasing said transistor to a nonconducting condition, said transistor emitter base junction and said biasing means including a predetermined resistance, means connected to the junction of said capacitor and said inductance for connecting said charging circuit to said transistor and said biasing means, a diode connected between said capacitor and inductance to substantially disconnect said capacitor from said inductance upon a change in the input pulse, wherein the current through said inductance in circuit with said bias means and said emitter-base junction biases said transistor to provide an output pulse as a function of the input pulse width and the inductance-resistance time constant of the transistor and bias means.

3. The apparatus of claim 2 further including a capacitor charging resistor in parallel with said diode whereby the current flow contributes to the base current of said transistor to compensate for any loss of current in said biasing circuit.

References Cited in the file of this patent

UNITED STATES PATENTS

| | | |
|---|---|---|
| 2,793,303 | Fleisher | May 21, 1957 |
| 2,843,761 | Carlson | July 15, 1958 |
| 2,904,679 | Hoover | Sept. 15, 1959 |
| 3,026,422 | Phylip-Jones | Mar. 20, 1962 |
| 3,028,553 | Richter | Apr. 3, 1962 |